United States Patent
Mayell

(10) Patent No.: US 8,780,589 B2
(45) Date of Patent: Jul. 15, 2014

(54) POWER SYSTEM WITH SHARED CLAMP RESET

(71) Applicant: Power Integrations, Inc., San Jose, CA (US)

(72) Inventor: Robert J. Mayell, Los Altos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/801,054

(22) Filed: Mar. 13, 2013

(65) Prior Publication Data

US 2013/0194834 A1   Aug. 1, 2013

Related U.S. Application Data

(63) Continuation of application No. 13/171,807, filed on Jun. 29, 2011, now Pat. No. 8,416,585, which is a continuation of application No. 12/437,481, filed on May 7, 2009, now Pat. No. 7,995,360.

(51) Int. Cl.
*H02M 3/335* (2006.01)
*H02M 1/00* (2006.01)

(52) U.S. Cl.
CPC .. *H02M 3/33546* (2013.01); *H02M 2001/0032* (2013.01); *H02M 3/33507* (2013.01); *H02M 70/16* (2013.01); *H02M 2001/008* (2013.01); *H02M 3/335* (2013.01)
USPC ............... 363/21.12; 363/18; 363/20; 363/65

(58) Field of Classification Search
USPC ................. 363/15, 16, 55, 65, 71, 72, 95, 97, 363/56.12, 131
See application file for complete search history.

(56) References Cited

U.S. PATENT DOCUMENTS 5,471,376 A * 11/1995 Tsai et al. ...................... 363/20
5,790,391 A    8/1998 Stich et al.

(Continued)

FOREIGN PATENT DOCUMENTS

| CN | CN 1558542 A | 12/2004 |
|---|---|---|
| JP | 05-176533 | 7/1993 |
| JP | 58-025581 | 12/2004 |
| JP | 2011-103573 A | 5/2011 |

OTHER PUBLICATIONS

JP 2009-215811—First Japanese Office Action with English Translation, issued May 14, 2013 (7 pages).

(Continued)

*Primary Examiner* — Nguyen Tran
(74) *Attorney, Agent, or Firm* — Blakely Sokoloff Taylor & Zafman LLP

(57) ABSTRACT

An example power supply includes a first power converter, a second power converter, and a shared clamp reset circuit. The first power converter is adapted to convert an input to a first voltage output and includes a first diode and a first transformer having a first primary winding. The second power converter is adapted to convert the input to a second voltage output and includes a second diode and a second transformer having a second primary winding. The shared clamp reset circuit is included in the first power converter and is coupled to the cathode of the first diode. The shared clamp reset circuit also includes a clamp connection that is coupled to the cathode of the second diode. The shared clamp reset circuit is adapted to manage leakage inductance energy within the first transformer and within the second transformer.

13 Claims, 9 Drawing Sheets

(56) References Cited

U.S. PATENT DOCUMENTS

| | | |
|---|---|---|
| 5,796,595 A | 8/1998 | Cross |
| 5,872,705 A | 2/1999 | Loftus, Jr. et al. |
| 5,991,171 A | 11/1999 | Cheng |
| 6,108,217 A | 8/2000 | Tran |
| 6,295,213 B1 | 9/2001 | Smith |
| 6,349,046 B2 | 2/2002 | Yasumura |
| 6,496,390 B2 | 12/2002 | Yang |
| 6,515,875 B2 | 2/2003 | Yasumura |
| 6,639,814 B2 | 10/2003 | Gan et al. |
| 6,714,426 B1 | 3/2004 | Guo et al. |
| 6,908,164 B2 | 6/2005 | Gilbert et al. |
| 6,987,675 B2 | 1/2006 | Jovanovic et al. |
| 7,995,360 B2 | 8/2011 | Mayell |
| 8,416,586 B2 | 4/2013 | Mayell |
| 2003/0021130 A1 | 1/2003 | Cohen |
| 2005/0073861 A1 | 4/2005 | Ke et al. |
| 2009/0175054 A1 | 7/2009 | Appel et al. |
| 2009/0257254 A1 | 10/2009 | Leu |
| 2010/0073968 A1 | 3/2010 | Mayell |
| 2010/0110733 A1 | 5/2010 | Lim et al. |
| 2011/0254369 A1 | 10/2011 | Mayell |
| 2012/0250364 A1 | 10/2012 | Mayell |

OTHER PUBLICATIONS

CN 200910169099.7—First Chinese Office Action with English Translation, issued Mar. 18, 2013 (44 pages).

Final Office Action, mailed Jan. 19, 2012, U.S. Appl. No. 12/234,519.

Mayell, R., U.S. Appl. No. 13/801,279, filed Mar. 13, 2013.

JP 2009-215811—Second Japanese Office Action with English Translation, issued Mar. 18, 2014 (5 pages).

* cited by examiner

POWER SYSTEM WITH SHARED CLAMP RESET

REFERENCE TO RELATED APPLICATIONS

The present application is a continuation of U.S. patent application Ser. No. 13/171,807, filed on Jun. 29, 2011, now pending, which is a continuation of U.S. patent application Ser. No. 12/437,481, filed on May 7, 2009, now issued as U.S. Pat. No. 7,995,360. U.S. patent application Ser. No. 13/171, 807 and U.S. Pat. No. 7,995,360 are hereby incorporated by reference.

The application is related to U.S. patent application Ser. No. 12/234,519, filed on Sep. 19, 2008 and now issued as U.S. Pat. No. 8,279,636.

BACKGROUND OF THE INVENTION

1. Field of the Invention

The present invention relates generally to power supplies, and more specifically to power supplies typically utilized in electrical equipment such as a printer, or the like that uses a standby power and a main power supply.

2. Discussion of the Related Art

Particular types of power supplies may convert the alternating current (AC) line delivered from a wall socket to the direct current (DC) power usable with today's electronics. In some circumstances, power supplies generally utilize two separate power supplies within the power supply itself.

In one example, a personal computer (PC) may use a power supply which includes a main power supply and a standby power supply. Both the main and standby power supplies relay power to other components comprising a PC. The PC main supplies the main power, which supplies power to the motherboard and processor of a PC. In addition, the PC main is designed to provide a large amount of output power (which is typically between 200-400 watts) to supply the motherboard and additional components, such as disk drives and video cards. On the other hand, the standby power supply provides a lower amount of output power (which is typically less than 5 or 10 watts).

Unlike the main power supply, which powers down when a user has indicated shut down of the PC (or other electronic device), the standby power supply normally does not shut down and (after being powered up) continues to convert an input voltage into an appropriate output voltage. Thus, the main power supply operates on an as-needed basis, while the standby power supply continues to operate whenever an input voltage is present (i.e. the power supply is plugged into a wall socket). The standby power supply then provides power to components which continue to run once the PC (or other electronic device) has been powered down in response to a user indication. For example, the standby power supply provides power to the power button of a computer so a user can use the power button to manually start the PC (which provides an indication to power up or power down the main power converter). In another application, the main and standby power supply may be utilized with a printer. The standby power supply may provide power to the network connection of a printer such that the printer may monitor for any incoming print job requests while in a standby (or idle) mode and become active when a print job request is received.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
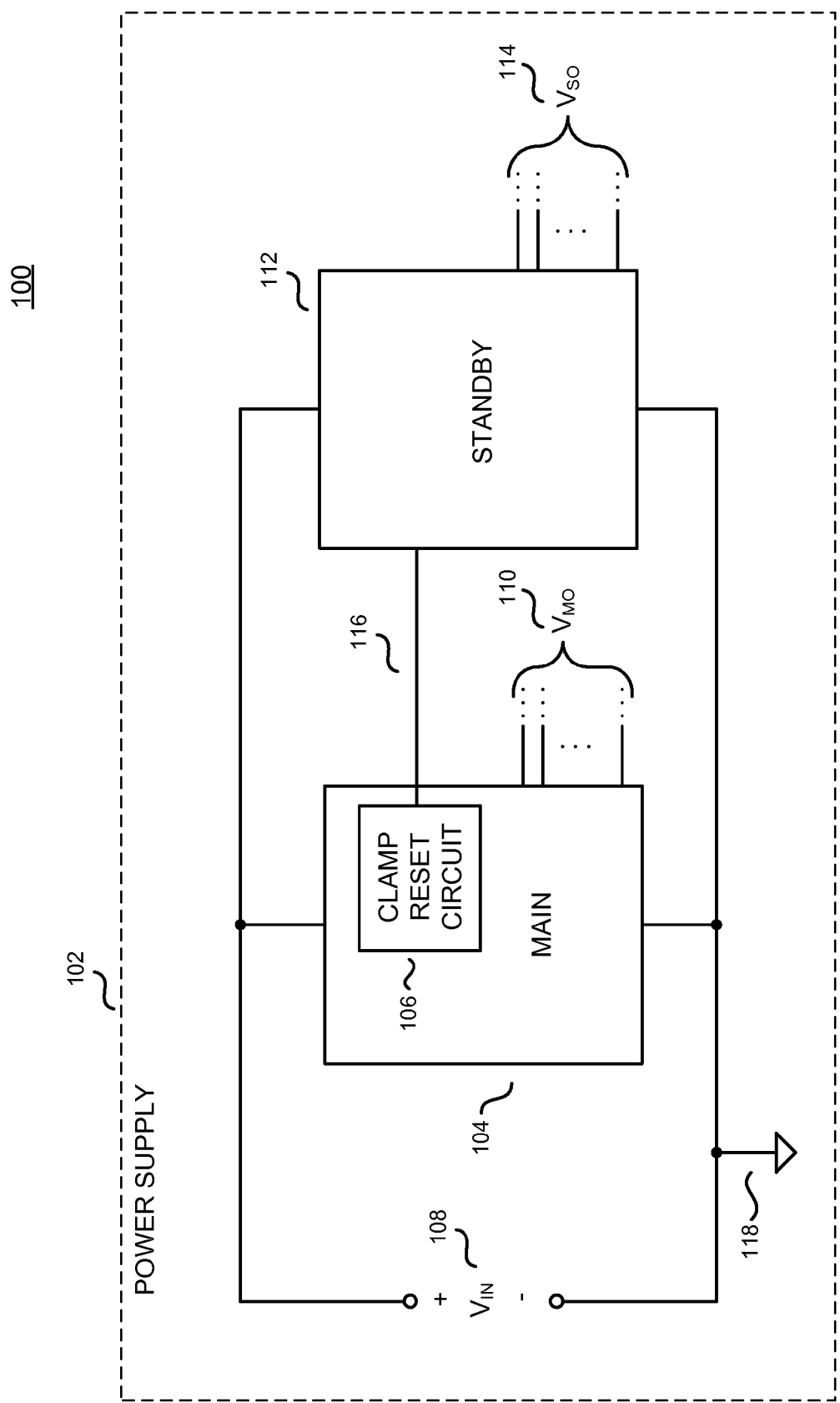
FIG. 1 illustrates a system block diagram of a power supply system in accordance with one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

As mentioned above, a power supply may utilize a main power supply and a standby power supply in operation. The main power supply is typically designed with a two-switch forward converter. The two-switch forward converter is a low cost configuration that is suited for power supplies for personal computers and similar applications. The two-switch forward converter also has the advantages of producing high output current at high efficiencies. Alternatively, the main power supply may also be designed with a single-switch forward converter. For both of these forward converter topologies, an additional reset circuit may be utilized to manage the magnetizing energy of the transformer used in either the two-switch or single-switch forward converter topology.

On the other hand, the standby power converter is often designed with a flyback converter. The flyback converter typically provides low output currents at low component cost. In addition, the flyback converter may utilize an additional clamp circuit which prevents excess voltage from damaging components within the flyback converter. However, it should be appreciated that the standby power converter may be designed with a two-switch or single-switch forward converter topology or the two-switch flyback converter topology. Typically, each converter topology used in the power supply utilizes its own reset circuit or clamp circuit.

In accordance with the teachings of the invention, the main power supply and the standby power supply may both utilize a single clamp reset circuit. The clamp reset circuit provides substantially similar advantages as the reset circuit typically utilized with the main power supply and further provides similar advantages as the clamp circuit typically utilized with the standby power supply. The components of the clamp reset circuit may be found within the main power supply and the standby power supply may electrically couple to the same clamp reset circuit. Alternatively, the clamp reset circuit may be found within standby power supply and the main power supply may electrically couple to the same clamp reset circuit. In other examples, the clamp reset circuit is a separate entity to which both the main power supply and the standby power supply electrically couple. By allowing the main power supply and the standby power supply to share the same clamp reset circuit, the teachings of the present invention may utilize fewer components and may provide a lower cost system than standard main and standby power supply designs used in electrical equipment, such as PC power supplies, printers, or the like.

Referring first to FIG. 1, a system block diagram of a power supply system 100 in accordance with one embodiment of the present invention is illustrated including a power supply 102, a main power supply 104, a clamp reset circuit 106, an input ($V_{IN}$) 108, a main output ($V_{MO}$) 110, a standby power supply 112, a standby output ($V_{SO}$) 114, a clamp standby connection 116, and an input return 118.

The power supply 102 includes a main power supply 104. The main power supply 104 further includes a clamp reset circuit 106, which is coupled to other components within the main power supply 104, and main output ($V_{MO}$) 110. The main power supply 104 is coupled to the input ($V_{IN}$) 108, the standby power supply 112, and the input return 118 such that the voltage across the main power supply 104 is substantially equivalent to the input ($V_{IN}$) 108. In addition, the standby power supply 112 is also coupled to the input ($V_{IN}$) 108 and input return 118 such that the voltage across the standby power supply 112 is substantially equivalent to the input ($V_{IN}$) 108. The standby power supply 112 is also coupled to the standby output ($V_{SO}$) 114. Through the clamp standby connection 116, the clamp reset circuit 106 is coupled to components comprising the standby power supply 112. The input ($V_{IN}$) 108, main power supply 104 and standby power supply 112 are coupled to input return 118. The input return 118 provides the point of lowest potential, or in other words the point of lowest voltage with respect to the input ($V_{IN}$) 108, for the power supply system 100.

Within the power supply 102, the main power supply 104 comprises circuitry to convert the received input ($V_{IN}$) 108 into an appropriate output (and in some embodiments, one or more output levels). In one embodiment, the input ($V_{IN}$) 108 may be a rectified AC voltage. In one example, the main power supply 104 utilizes a forward converter topology to convert the incoming power to the desired output level (further illustrated with respects to FIGS. 2 and 3). The main power supply 104 provides the output to one or more devices external from the power supply 102. However, the main power supply 104 can also provide appropriate output levels to devices which are internal to the power supply 102. It should be appreciated that the main power supply 104 may comprise one or more main outputs ($V_{MO}$) 110 which provide power to one or more devices. It should also be appreciated that the main output ($V_{MO}$) 110 may also output voltages, currents, or a combination of both. In one embodiment, the main power supply 104 provides a variety of different output levels along each main output ($V_{MO}$) 110. For example, the main power supply 104 may provide output voltages such as 3.3 Volts (V), 5 V, or +/−12V. In addition, the main power supply further comprises circuitry of the clamp reset circuit 106. The use of the clamp reset circuit 106 allows the main power supply 104 to manage the magnetizing energy and the leakage inductance energy within the transformer of the main power supply 104. In other words, the clamp reset circuit 106 allows the main power supply 104 to operate at a larger range of input voltages.

The standby power supply 112 also comprises circuitry to convert the input ($V_{IN}$) 108, which comprises a rectified AC voltage in some embodiments, into an appropriate output level. In some examples, the standby power supply 112 utilizes a flyback converter topology to convert the incoming power to the desired output level (and in some embodiments, one or more output levels). The flyback converter topology is further illustrated with respect to FIG. 4. However, in other embodiments the standby power supply 112 may also utilize a two-switch or single-switch forward converter topology or the two-switch flyback converter topology. Output from the standby power supply 112 is provided to one or more devices external to the power supply 102. The standby power supply 112 can provide appropriate output levels to devices which are internal to the power supply 102. However, it should be appreciated that the standby power supply 112 may comprise one or more standby outputs ($V_{SO}$) 114. It should also be appreciated that the standby output ($V_{SO}$) 114 may also output voltages, currents, or a combination of both. In addition, the standby power supply 112 may also be adapted to provide a variety of different output levels along each standby output ($V_{SO}$) 114. For example, the standby power supply 112 may provide a variety of different voltage levels along each standby output ($V_{SO}$) 114 such as 3.3 Volts (V), 5 V, or 12V. The clamp standby connection 116 electrically couples the standby power supply 112 to the clamp reset circuit 106. Use of the clamp reset circuit 106 with the standby power supply 112 allows the standby power supply 112 to manage the leakage inductance energy within the transformer or coupled inductor of the standby power supply 112 and prevents excessive voltage from damaging the electrical components (further illustrated with regards to FIG. 4) comprising the standby power supply 112.

It should be appreciated that in some examples of the present invention, the clamp reset circuit 106 may be found within the standby power supply 112 rather than the main power supply 104. However, the main power supply 112 may electrically couple to the clamp reset circuit 106. In other examples, the clamp reset circuit 106 is a separate entity to which both the main power supply 104 and the standby power supply 112 electrically couple. By allowing the main power converter 104 and the standby power supply 112 to share the same clamp reset circuit 106, the teachings of the present invention may utilize fewer components and may provide a lower cost system than standard main and standby power supply designs used in electrical equipment, such as PC power supplies, printers, or the like.

Figure 2:
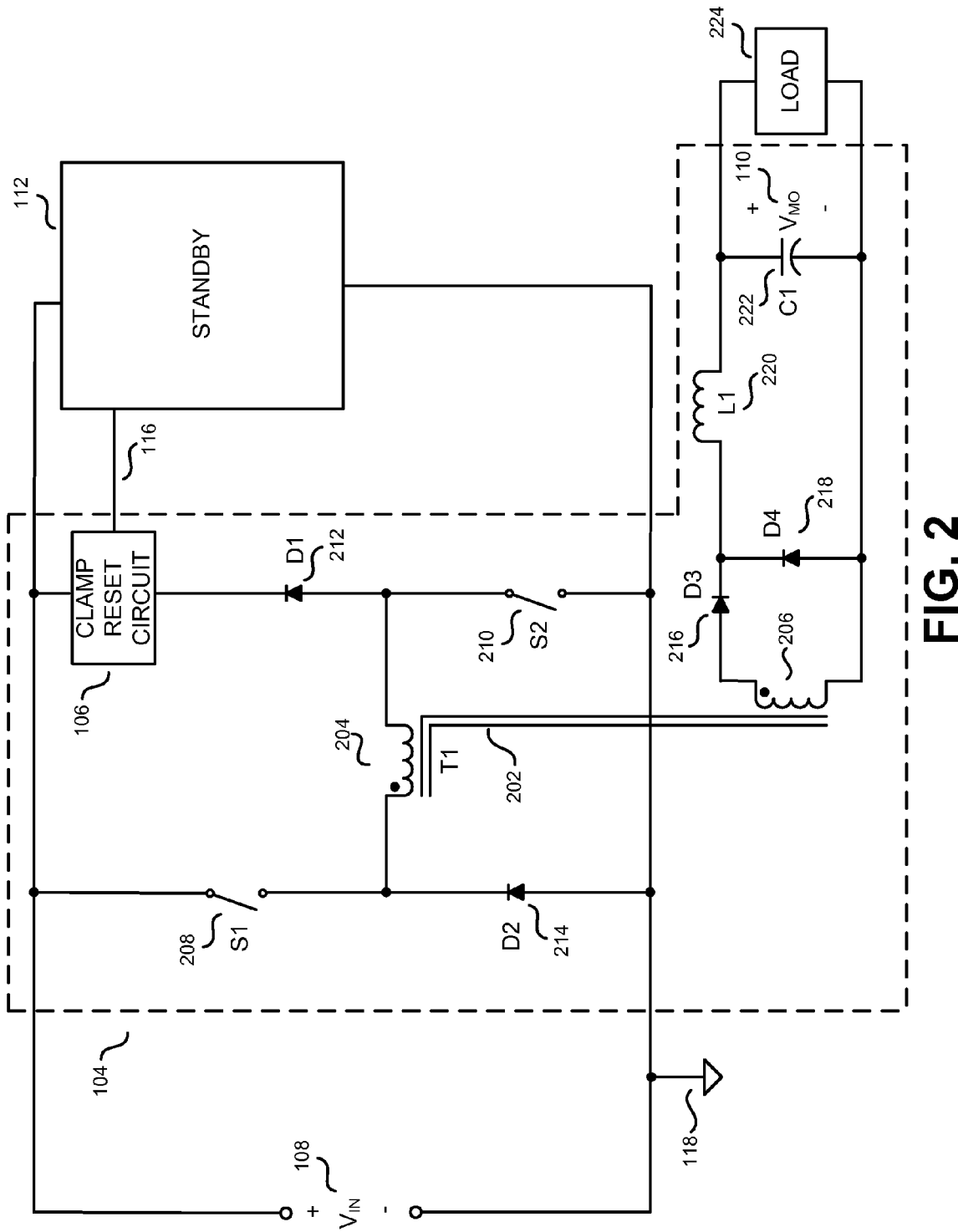
FIG. 2 illustrates a schematic diagram of a main power supply utilized with the power supply system of FIG. 1 in accordance with one embodiment of the present invention.

Referring next to FIG. 2, a schematic diagram is illustrated of a main power supply 104 utilized with the power supply system including clamp reset circuit 106, input ($V_{IN}$) 108, main output ($V_{MO}$) 110, standby power supply 112, clamp standby connection 116, input return 118, a transformer T1 202, a primary winding 204 of transformer T1 202, a secondary winding 206 of transformer T1 202, two active switches S1 208 and S2 210, two passive switches D1 212 and D2 214, an output diode D3 216, a freewheeling diode D4 218, an output inductor L1 220, an output capacitor C1 222, and a load 224.

The main power supply 104, clamp reset circuit 106, input ($V_{IN}$) 108, standby power supply 112, clamp standby connection 116, and input return 118 are electrically coupled as discussed with respect to FIG. 1. As mentioned above, the main power supply 104 may be designed with a two-switch forward converter topology. The two-switch forward converter is often the lowest cost configuration suited for power supplies for personal computers and similar applications. However, it should be appreciated that other topologies for the main power supply 104 may benefit from the teachings of the present invention.

An active switch normally receives a control signal which switches between states to control the opening and closing of the active switch, whereas a passive switch does not receive a control signal to switch between an open and closed state. An open switch normally does not conduct current. A closed switch can conduct current. Active switches typically have one or more control terminals that determine whether or not two other terminals of the active switch may conduct current. The control signals that open and close active switches S1 208 and S2 210 (as illustrated in FIG. 2 and in subsequent figures depicting active switches) are not shown to help avoid obscuring more important details of the invention.

Passive switches generally have only two terminals. Typically, the voltage between the terminals determines whether a passive switch is open or closed. A diode is sometimes considered a passive switch, because it generally conducts current when the voltage between its two terminals has one polarity (anode positive with respect to cathode), and substantially blocks current when the voltage between the terminals has the opposite polarity (anode negative with respect to cathode).

The main power supply 104 further comprises transformer T1 202, primary winding 204 of transformer T1 202, secondary winding 206 of transformer T1 202, two active switches S1 208 and S2 210, two passive switches D1 212 and D2 214, an output diode D3 216, a freewheeling diode D4 218, output inductor L1 220, and output capacitor C1 222 coupled together in a two-switch topology with reset capabilities illustrated herein. As shown, the active switch S1 208 is coupled to input ($V_{IN}$) 108 and passive switch D1 212 is also coupled to input ($V_{IN}$) 108 through the clamp reset circuit 106. The active switch S2 210 and the passive switch D2 214 are both coupled to the input return 118. However, it should be appreciated that variants of the example power converter topology may be utilized with the teachings of the present invention. Clamp reset circuit 106 is coupled to passive switch D1 212 and to input ($V_{IN}$) 108. However, it should be appreciated that in some embodiments the clamp reset circuit 106 may be coupled to input return 118 as illustrated with regards to FIG. 3B. The output is provided from the main power supply 104 through the main output ($V_{MO}$) 110, exemplified as the voltage across the output capacitor C1 222, and provided to a load 224 external from the power supply 102. The load 224 includes other electrical components receiving power from the power supply system 100, such as motherboards or hard disk drives. Although in some embodiments, the load 224 may be internal to the power supply 102.

The main power supply 104 utilizing the two-switch forward converter topology comprises two active switches, S1 208 and S2 210, with two passive switches, D1 212 and D2 214, and clamp reset circuit 106 in a configuration that produces a voltage on a primary winding 204 of a transformer T1 202 from an input ($V_{IN}$) 108. A secondary winding 206 of the transformer T1 202 produces a voltage proportional to the voltage on a primary winding 204 of a transformer T1 202. An output diode 216 rectifies the voltage at the secondary winding 206. A freewheeling diode D4 218 establishes a path for current in the output inductor L1 when the output diode D3 216 is reverse biased. An output inductor L1 220, and an output capacitor C1 222 filter the rectified voltage from the secondary winding 206 to produce a main output ($V_{MO}$) 110 at the load 224. As shown, primary winding 204 is galvanically isolated from secondary winding 206. In particular, galvanic isolation prevents DC current from the primary side circuitry (circuitry electrically coupled to the primary winding 204) from being received by secondary circuitry (circuitry electrically coupled to the secondary winding 206). However, it should be appreciated that the primary winding 204 need not be galvanically isolated from the secondary winding 206.

As illustrated, the main power supply 104 utilizes the clamp reset circuit 106 along with the two-switch forward converter topology. The clamp reset circuit 106 manages the magnetizing energy and leakage inductance of the transformer T1 202 of the main power supply 104. The two-switch forward converter configuration allows the magnetic energy of the transformer T1 202 to reset (that is, return to a much lower value) when the active switches S1 208 and S2 210 are off. Resetting (or in other words reducing) the magnetizing energy of the transformer T1 202 prevents excess stored energy from saturating the core material of the transformer T1 202 and thereby altering its properties. The reset is generally achieved by applying a reset voltage of appropriate magnitude and duration to the primary winding 204 when the active switches S1 208 and S2 210 are off. It is often desirable to set the reset voltage to a higher value than the voltage which appears on the primary winding 204 when the active switches S1 208 and S2 210 are on. Setting the reset voltage to a higher value than the voltage which appears on the primary winding 204 when the active switches S1 208 and S2 210 are on allows for faster reset. The clamp reset circuit 106 develops a substantially constant voltage which is applied to the primary winding during the reset time of the transformer T1 202. In the example of the two-switch forward converter illustrated in FIG. 2, the reset voltage is a sum of the input voltage ($V_{IN}$) 108 and the voltage on the clamp reset circuit 106. For the main power supply 104, the clamp reset circuit 106 increases the voltage on the primary winding 204 of the transformer T1 202 when the passive switches, D1 212 and D2 214, are conducting current and the active switches S1 208 and S2 210 are open. As mentioned above, the clamp reset circuit 106 is also electrically coupled to the standby power supply 112 through clamp standby connection 116 and is utilized to manage the leakage inductance energy and to prevent excessive voltage from damaging the components comprising the standby power supply 112. In other words, the clamp reset circuit 106 "clamps" the voltage for components of the standby power supply 112 within acceptable tolerance levels.

Generally, the main power supply 104 and the standby power supply 112 within a power supply are two separate power supplies sharing the same input and providing their respective outputs. The main power supply 104 and the standby power supply 112 share the clamp reset circuit 106, in accordance with the teachings of the present invention, and the configuration of the main power supply 104 and the standby power supply 112 discussed may lower solution cost.

Figure 3A:
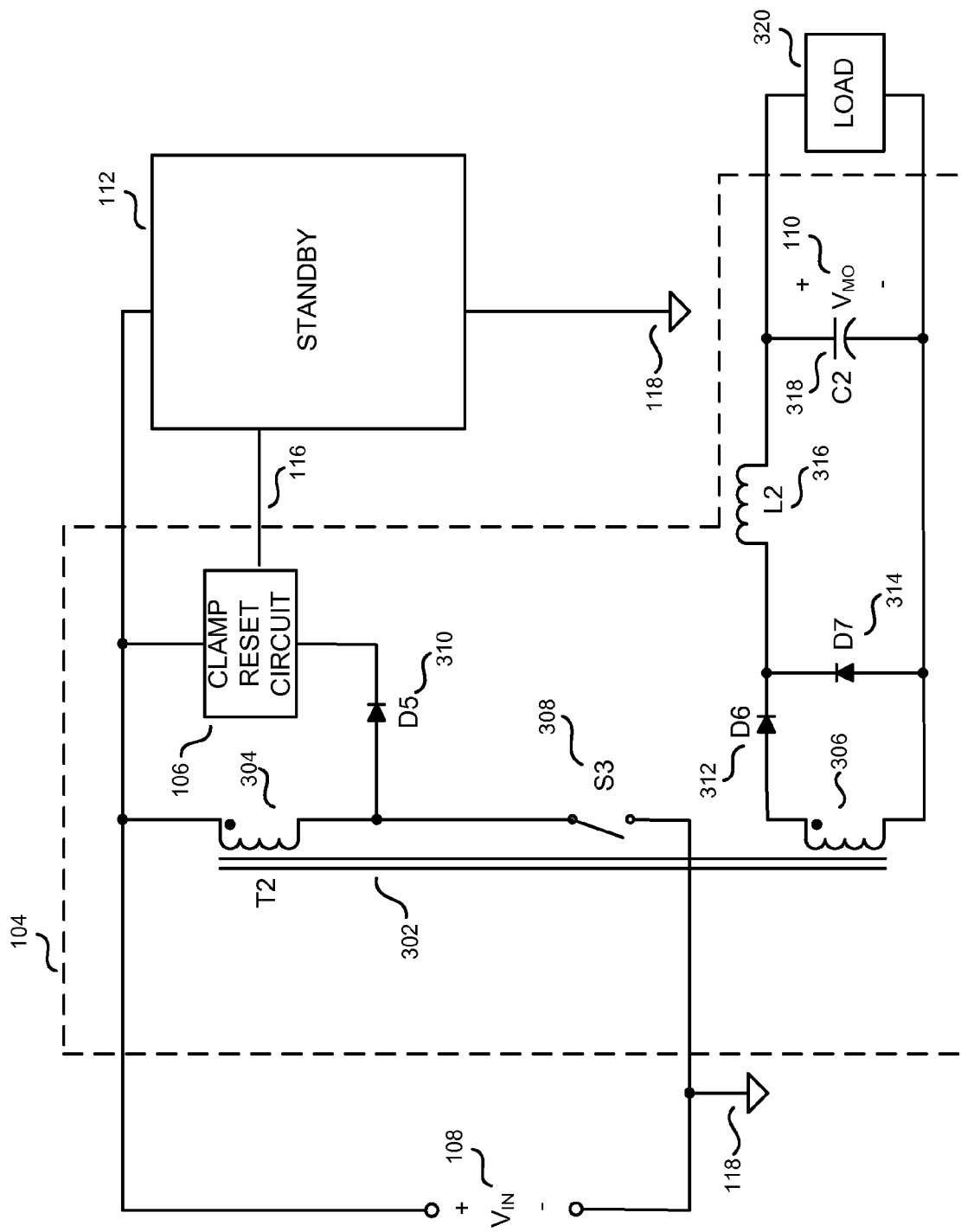
FIG. 3A illustrates another schematic diagram of a main power supply utilized with the power supply system of FIG. 1 in accordance with another embodiment of the present invention.

Referring to FIG. 3A, another schematic diagram of a main power supply 104 utilized with the power supply system 100 is illustrated including clamp reset circuit 106, input ($V_{IN}$) 108, main output ($V_{MO}$) 110, standby power supply 112, clamp standby connection 116, input return 118, a transformer T2 302, a primary winding 304 of transformer T2 302, a secondary winding 306 of transformer T2 302, an active switch S3 308, a passive switch D5 310, an output diode D6 312, a freewheeling diode D7 314, an output inductor L2 316, an output capacitor C2 318, and a load 320.

The main power supply 104, clamp reset circuit 106, input ($V_{IN}$) 108, standby power supply 112, clamp standby connection 116, and input return 118 are electrically coupled and function as discussed above with respect to FIG. 1. Unlike the main power supply 104 illustrated in FIG. 2, the main power supply 104 illustrated in FIG. 3A utilizes a single-switch forward converter topology. The main power supply comprises transformer T2 302, primary winding 304 of transformer T2 302, secondary winding 306 of transformer T2 302, active switch S3 308, passive switch D5 310, an output diode D6 312, a freewheeling diode D7 314, output inductor L2 316, output capacitor C2 318, and load 320 coupled together in a single-switch topology with reset capabilities illustrated herein. As shown, primary winding 304 is galvanically isolated from secondary winding 306. However, it should be appreciated that the primary winding 304 need not be galvanically isolated from the secondary winding 306. Clamp reset circuit 106 is coupled to the cathode of the passive switch D5 310 and the input ($V_{IN}$) 108. However, it should be appreciated that the clamp reset circuit 106 may alternatively be coupled to input return 118 as shown with respect to FIG. 3B. The output is provided from the main power supply 104 through the main output ($V_{MO}$) 110, exemplified as the voltage across the output capacitor C2 318, and provided to the load 320 external from the power supply 102. Although in some embodiments, the load 320 may be internal to the power supply 102.

The main power supply 104 utilizing the single-switch forward converter topology comprises active switch S3 308 with passive switch D5 310 and clamp reset circuit 106 in a configuration that produces a voltage on a primary winding 304 of a transformer T2 302 from an input ($V_{IN}$) 108. A secondary winding 306 of the transformer T2 302 produces a voltage proportional to the voltage on a primary winding 304 of a transformer T2 302. Components coupled to the secondary winding 306 of the transformer T2 302 function similarly to the components coupled to the secondary winding 206 of transformer T1 202 as discussed with respect to FIG. 2. The output diode D6 312, freewheeling diode D7 314, output inductor L2 316, and output capacitor C2 318 provide substantially similar functionality as the output diode D3, freewheeling diode D4, output inductor L1 220 and output capacitor C1 222 of the main power supply 104 utilizing the two-switch forward converter topology discussed above.

The clamp reset circuit 106 manages the magnetizing energy and leakage inductance of the transformer T2 302 of the main power supply 104. The single-switch forward configuration allows the magnetizing energy of the transformer T2 to reset, or in other words reduce the magnetizing energy, when the active switch S3 308 is off and prevents excess stored energy from saturating the core material of the transformer T2. As mentioned above, the reset is generally achieved by applying a reset voltage to the primary winding 304 when the active switch S3 308 is off and it is often desirable to set the reset voltage to a higher value than the voltage which appears on the primary winding 304 when the active switch S3 is on. The clamp reset circuit 106 develops a substantially constant voltage which is applied to the primary winding during the reset time of the transformer T2. For the example of the single-switch forward converter illustrated in FIG. 3A, the reset voltage is the voltage on the clamp reset circuit 106. For the main power supply 104 utilizing the single-switch forward converter topology, the clamp reset circuit 106 sets the voltage on the primary winding 304 of the transformer T2 302 when the passive switch D5 310 is conducting current.

Figure 3B:
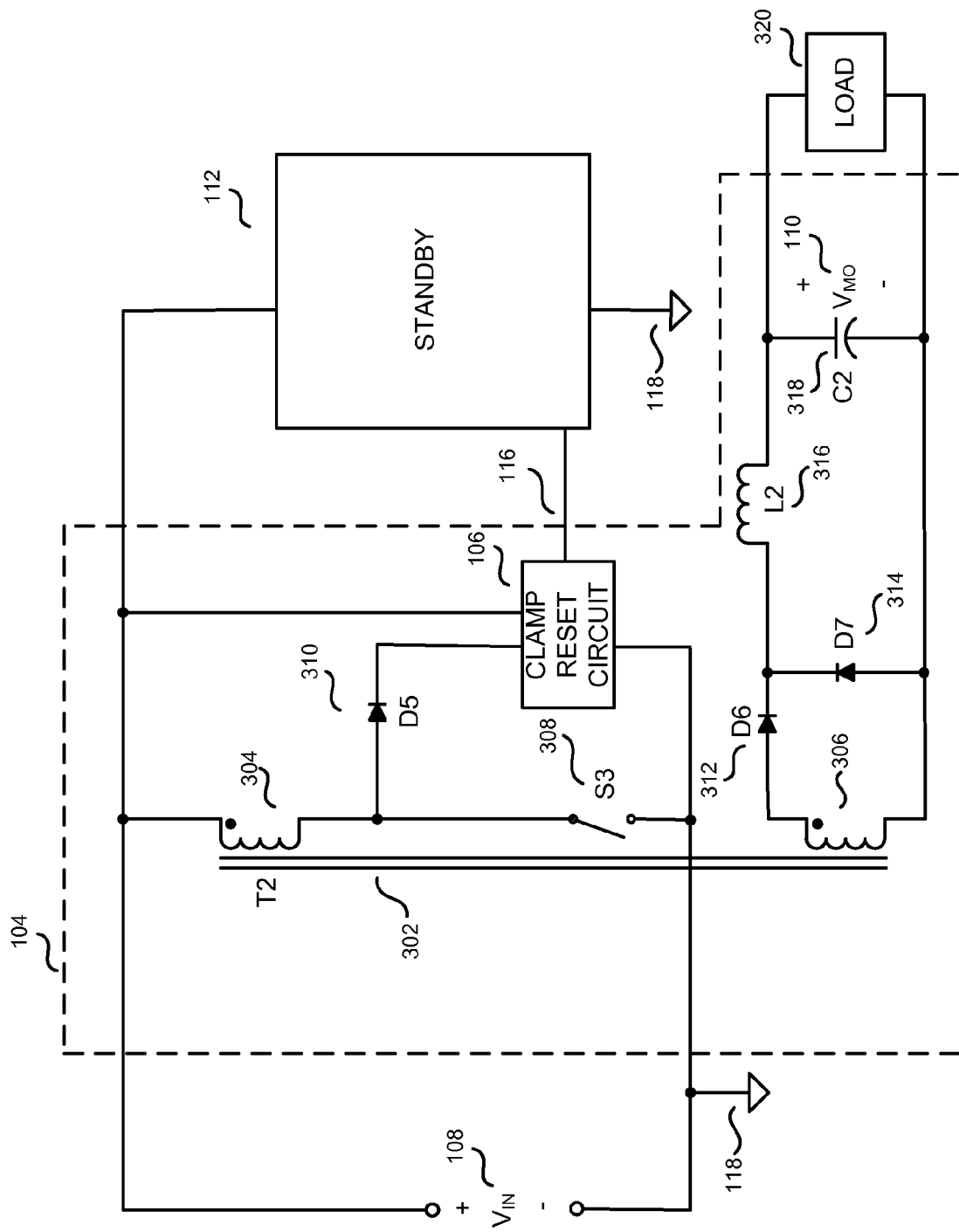
FIG. 3B illustrates another schematic diagram of a main power supply utilized with the power supply system of FIG. 1 in accordance with another embodiment of the present invention.

FIG. 3B illustrates another schematic diagram of a main power supply 104 utilized with the power supply system 100 is illustrated including clamp reset circuit 106, input ($V_{IN}$) 108, main output ($V_{MO}$) 110, standby power supply 112, clamp standby connection 116, input return 118, a transformer T2 302, a primary winding 304 of transformer T2 302, a secondary winding 306 of transformer T2 302, an active switch S3 308, a passive switch D5 310, an output diode D6 312, a freewheeling diode D7 314, an output inductor L2 316, an output capacitor C2 318, and a load 320.

Similar to the main power supply 104 discussed with respect to FIG. 3A, the main power supply 104 utilizes a single-switch forward converter topology. The components of FIG. 3B function substantially similar to the components introduced in FIG. 3A, however, the clamp reset circuit 106 is alternatively coupled to the cathode of passive switch D5 310 and input return 118. In other words the clamp reset circuit 106 may be coupled to the cathode of passive switch D5 310 and the negative terminal of the input ($V_{IN}$) 108.

As mentioned above, the clamp reset circuit 106 manages the magnetizing energy and leakage inductance of the transformer T2 302 of the main power supply 104 which allows the magnetizing energy of the transformer T2 302 to reset. For the example of the single-switch forward converter illustrated in FIG. 3B, the reset voltage is the difference of the voltage on the clamp reset circuit 106 and input voltage ($V_{IN}$) 108.

Figure 4:
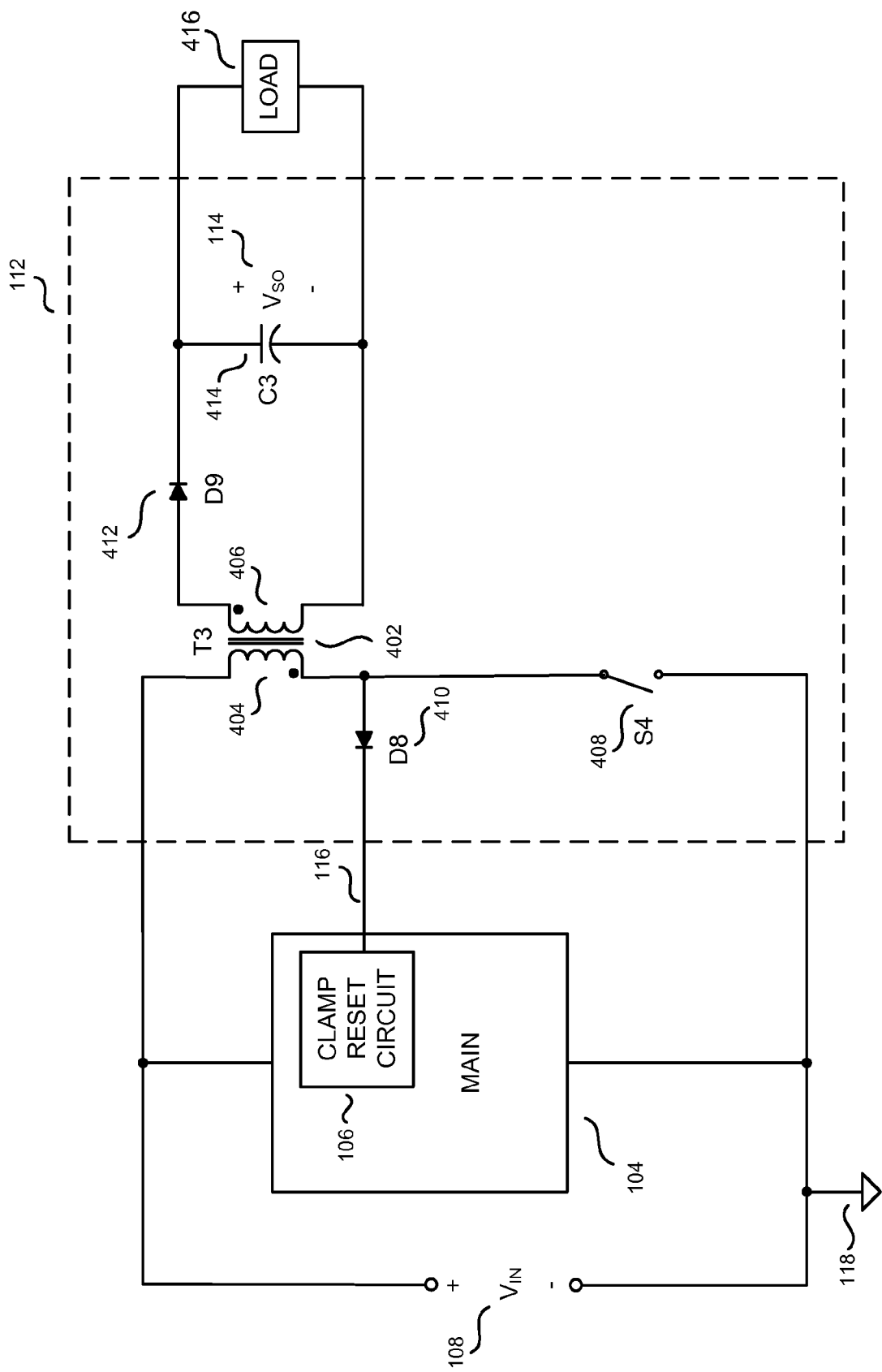
FIG. 4 illustrates a schematic diagram of a standby power supply utilized with the power supply system of FIG. 1 in accordance with one embodiment of the present invention.

FIG. 4 illustrates a schematic diagram of a standby power supply 112 utilized with the power supply system 100 comprising main power supply 104, clamp reset circuit 106, input ($V_{IN}$) 108, standby power supply 112, standby output ($V_{SO}$) 114, clamp standby connection 116, input return 118, a coupled inductor T3 402, a primary winding 404 of the coupled inductor T3 402, a secondary winding 406 of the coupled inductor T3 406, an active switch S4 408, a passive switch D8 410, a rectifier D9 412, an output capacitor C3, and a load 416. However, it should be appreciated that other topologies for the standby power supply 112 may benefit from the teachings of the present invention.

The main power supply 104, clamp reset circuit 106, input ($V_{IN}$) 108, standby power supply 112, clamp standby connection 116, and input return 118 are electrically coupled as discussed with respect to FIG. 1. As mentioned above, the standby power supply 112 is typically designed with a flyback converter topology utilizing a clamp circuit. However, it should be appreciated that a forward converter topology (such as the two-switch or single switch forward converter illustrated above), a two-switch flyback converter topology, or other converter topology could also be utilized to design the standby power supply 112. The flyback converter topology often provides a low cost solution suited for a standby power supply.

The standby power supply 112 further comprises coupled inductor T3 402, primary windings 404 of the coupled inductor T3 402, secondary windings 406 of the coupled inductor T3 406, active switch S4 408, passive switch D8 410, rectifier D9 412, output capacitor C3, and load 416 coupled together in a flyback converter topology with clamp capabilities illustrated herein. Clamp reset circuit 106 is coupled to the cathode of the passive switch D8 410. Further, the clamp reset circuit 106 may further be coupled to the positive terminal of input ($V_{IN}$) 108. In other embodiments, the clamp reset circuit 106 is further coupled to input return 118. Or in other words, the clamp reset circuit 106 may further be coupled to the positive or negative terminal of input ($V_{IN}$) 108. The clamp reset circuit 106 couples to the standby power supply 112 through clamp standby connection 116. The output is provided from the standby power converter 112 through the standby output ($V_{SO}$) 114, exemplified as the voltage across the output capacitor C3 414, and provided to a load 416 external from the power supply 102. Although in some embodiments, the load 416 may be internal to the power supply 102.

The standby power supply 112 utilizing the flyback converter topology comprises active switch S4 408 with passive switch D8 410 and clamp reset circuit 106 in a configuration which produces a voltage on the primary winding 404 of the coupled inductor T3 402 from an input ($V_{IN}$) 108. A secondary winding 406 of the coupled inductor T3 402 produces a voltage proportional to the voltage on the primary winding 404 of the coupled inductor T3 402. The output diode D9 412 rectifies the voltage at the secondary winding 406, and an output capacitor C3 filters the current from the output diode D9 412 to produce the standby output ($V_{SO}$) 114 at the load 416. As shown, primary winding 404 is galvanically isolated from secondary winding 406. However, it should be appreciated that the primary winding 404 need not be galvanically isolated from the secondary winding 406. As mentioned above, the standby power supply 112 is further coupled to the clamp reset circuit 106 through the clamp standby connection 116. The clamp reset circuit 106 allows the standby supply to manage the leakage inductance energy within the coupled inductor T3 and limits the maximum voltage on the active switch S4 408 when the passive switch D8 is conducting current. The main power supply 104 and the standby power supply 112 share the clamp reset circuit 106, in accordance with the teachings of the present invention, and the configuration discussed may provide lower cost benefits.

Figure 5A:
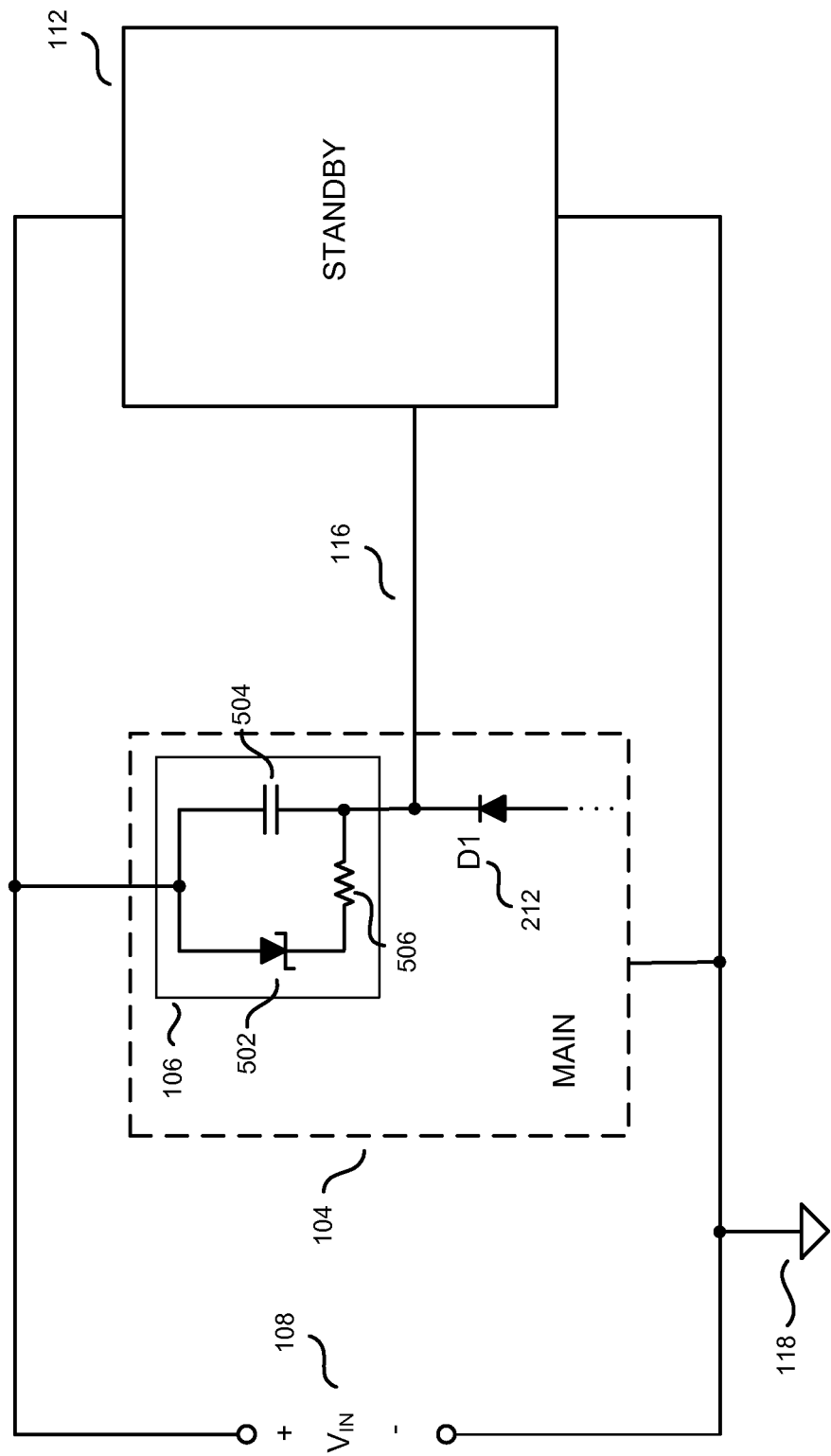
FIG. 5A illustrates a schematic diagram of a clamp reset circuit utilized with the power supply system of FIG. 1 in accordance with one embodiment of the present invention.

FIG. 5A illustrates one example of a schematic diagram of the clamp reset circuit 106 utilized with the power supply system 100 comprising main power supply 104, clamp reset circuit 106, input ($V_{IN}$) 108, standby power supply 112, clamp standby connection 116, input return 118, a Zener diode 502, a capacitor 504, and a resistor 506.

The main power supply 104, clamp reset circuit 106, input ($V_{IN}$) 108, standby power supply 112, clamp standby connection 116, and input return 118 are electrically coupled as discussed with respect to the previous figures. The Zener diode 502 is electrically coupled to the resistor 506; the Zener diode 502 and the resistor 506 are then electrically coupled to the capacitor 504. The clamp reset circuit 106 is coupled to the standby power supply 112 through the clamp standby connection 116. The standby power supply 112 electrically couples to the clamp reset circuit 106 at a point between the passive switch D1 212, when (for example) the configuration illustrated in FIG. 2 is utilized, and the clamp reset circuit 106. In another embodiment, the standby power supply 112 electrically couples to the clamp reset circuit 106 at passive switch D5 as illustrated in FIG. 3A. In other words, the standby power supply 112 electrically couples to the clamp reset circuit 106 at a point between the clamp reset circuit 106 and the input return 118. However, it should be appreciated that the main power supply 104 and the standby power supply 112 can be coupled to the clamp reset circuit using any number of configurations depending on the circuit topology utilized for the main and standby power supply 104 and 112.

As mentioned above, the clamp reset circuit 106 manages the magnetizing energy and leakage inductance of the transformer within the main power supply 104. Both the single switch configuration and the two switch configuration allow the magnetizing energy of the transformer to reset (in other words, return to a much lower value) when the active switches are off. Resetting the magnetizing energy of the transformer prevents excess stored energy from saturating the transformer. The reset is generally achieved by applying a reset voltage of appropriate magnitude and duration to the primary winding when the active switches are off. When a two-switch forward converter is used, the clamp reset circuit 106 allows the voltage on the primary winding of the main power supply 104 to increase when the passive switches are conducting current. On the other hand, the clamp reset circuit 106 prevents excess voltage from damaging components to occur in the standby power supply 112. In other words, the clamp reset circuit 106 limits the voltage across the active switch of the standby power supply 112 with a capacitor 504 which maintains a substantially constant voltage limited by the Zener diode 502. In general, the Zener diode 502 limits the voltage across the capacitor 504. The Zener diode 502 limits the energy received by the capacitor 504 from exceeding a threshold. The threshold typically corresponds to properties of the Zener diode 502, such as the Zener breakdown voltage.

In choosing the properties of the Zener diode 502, capacitor 504 and resistor 506, both the requirements of the main power supply 104 and the standby power supply 112 should be taken into account. Unlike the main power supply 104, the standby power supply 112 is constantly operating. As a result, the capacitor 504 within the clamp reset is constantly refreshed with energy from the leakage inductance of the standby power supply transformer (or coupled inductor). The capacitor 504 may remain charged regardless of whether the main power supply 104 is operating. With the capacitor 504 charged, the main power supply 104 can bring the main output ($V_{MO}$) 110 into regulation faster than if the capacitor 504 was not charged.

By sharing the clamp reset circuit 106, the standby power supply 112 generates a stable clamp voltage. In general, the main power supply 104 eventually shuts off (usually in response to a user indication) while the standby power supply 112 remains constantly operating. Since the standby power supply 112 is constantly running, the standby power supply 112 provides a stable clamp voltage in the clamp reset circuit 106. The main power supply 104 advantageously uses the stable clamp voltage for resetting the energy within the transformer of the main power supply 104. As a result, the main power supply 104 may even operate under no-load conditions. By sharing the components of the clamp reset circuit 106, the main power supply 104 may rely on the stable clamp voltage regardless of the load conditions on the main power supply 104.

Figure 5B:
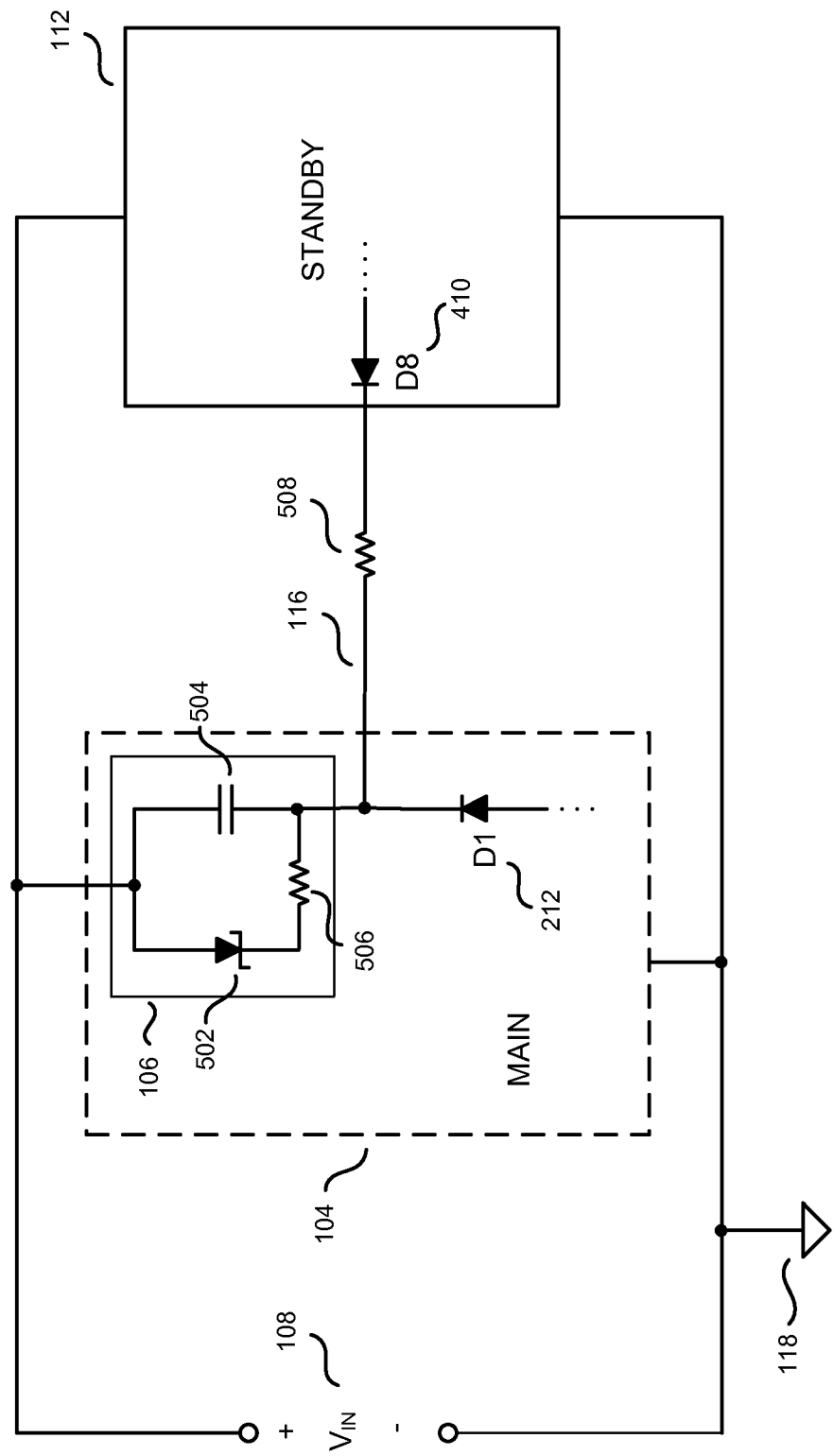
FIG. 5B illustrates another schematic diagram of a clamp reset circuit utilized with the power supply system of FIG. 1 in accordance with one embodiment of the present invention.

FIG. 5B illustrates another schematic diagram of a clamp reset circuit 106 utilized with the power supply system 100 including main power supply 104, clamp reset circuit 106, input ($V_{IN}$) 108, standby power supply 112, clamp standby connection 116, input return 118, a Zener diode 502, a capacitor 504, and a clamp reset resistor 506, and a standby current limiting resistor 508.

The main power supply 104, clamp reset circuit 106, input ($V_{IN}$) 108, standby power supply 112, clamp standby connection 116, and input return 118 are electrically coupled as discussed with respect to the previous figures. Components of the clamp reset circuit 106, such as the Zener diode 502, capacitor 504, and clamp reset resistor 506 function and are coupled substantially as described with respect to FIG. 5A. Additionally, standby current limiting resistor 508 is coupled between the passive switch D8 212 and the clamp reset circuit 106.

Standby current limiting resistor 508 may be coupled to passive switch D8 when a slow diode is utilized for the passive switch. Passive switches may comprise PN junction diodes. When the polarity of the voltage on a PN junction diode transitions to change the state of the diode from conducting current to blocking current (otherwise known as an ON or OFF state), there is a momentary reverse current for a period of time known as the reverse recovery time. The length of the reverse recovery time characterizes whether a diode is a slow or a fast diode. A diode which has a short reverse recovery time is considered to be a fast diode. A diode having a long reverse recovery time can be known as a slow diode. A fast diode typically has a reverse recovery time substantially less than one microsecond. A slow diode typically has a reverse recovery time greater than one microsecond. In some cases, a large amount of uncontrolled reverse current may dissipate power and lower the efficiency of the power supply. The use of a current limiting resistor (such as resistor 508) with a slow diode limits the amount of reverse current passing through passive switch D8 410. Although not illustrated, an additional current limiting resistor may be utilized in series with the passive switch D1 212 when the passive switch D1 212 is a slow diode. It should be appreciated that the power supply system 100 may utilize either the standby current limiting resistor 508, or the additional current limiting resistor coupled to passive switch D1 212, or both when slow diodes are utilized for either passive switches D8 410 or D1 212, or both.

Figure 5C:
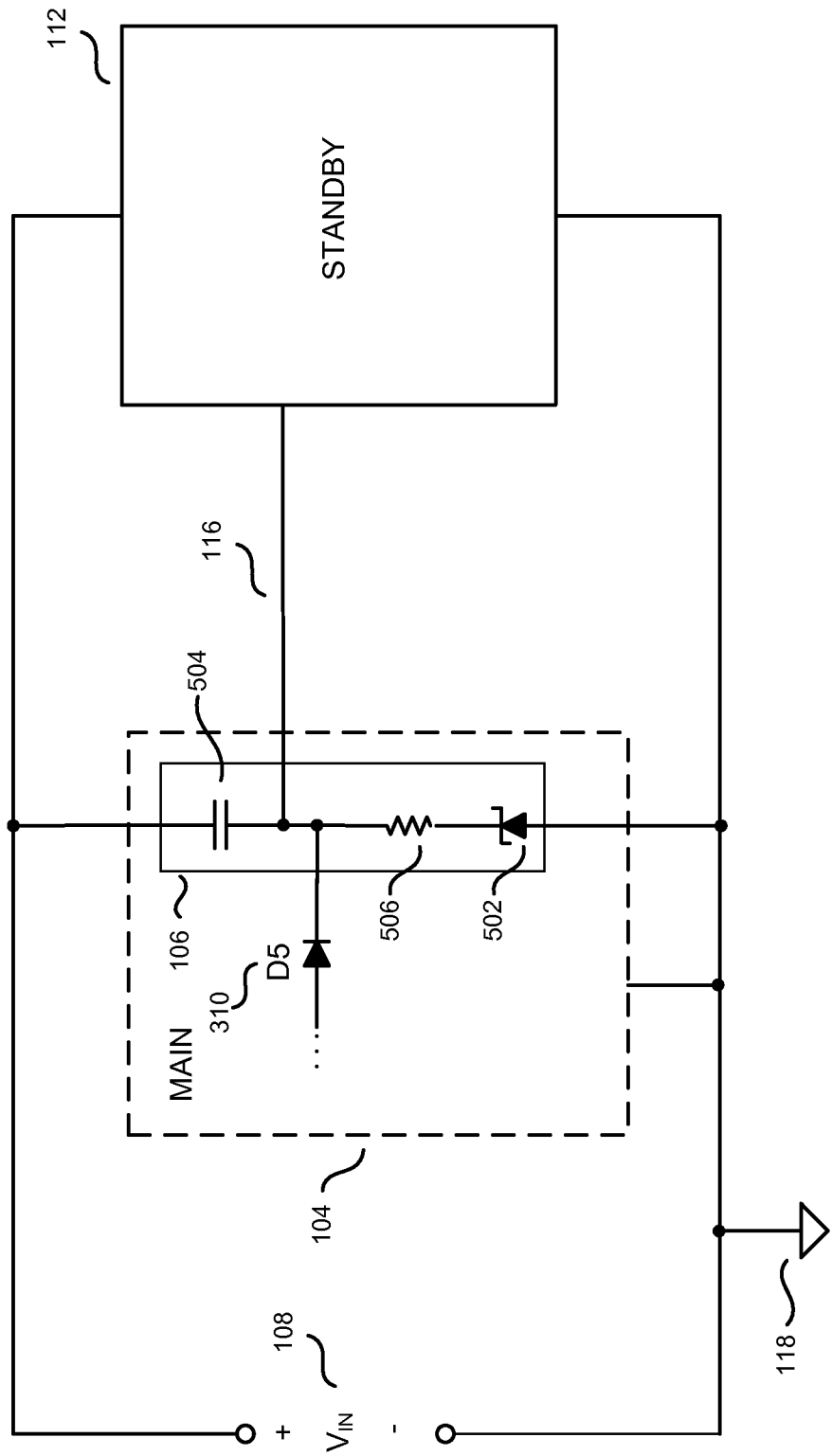
FIG. 5C illustrates a further schematic diagram of a clamp reset circuit utilized with the power supply system of FIG. 1 in accordance with one embodiment of the present invention.

FIG. 5C illustrates a further schematic diagram of a clamp reset circuit 106 utilized with the power supply system 100 including main power supply 104, clamp reset circuit 106, input ($V_{IN}$) 108, standby power supply 112, clamp standby connection 116, input return 118, a Zener diode 502, a capacitor 504, and a resistor 506.

FIG. 5C illustrates a clamp reset circuit 106 coupled to the input return 118 as discussed with respect to FIG. 3B. The main power supply 104, clamp reset circuit 106, input ($V_{IN}$) 108, standby power supply 112, clamp standby connection 116, and input return 118 are electrically coupled as discussed with respect to the previous figures. The Zener diode 502 is electrically coupled to the resistor 506; the Zener diode 502 and the resistor 506 are then electrically coupled to the capacitor 504. The standby power supply 112 electrically couples to the clamp reset circuit 106 at a point between the passive switch D5 310, when (for example) the configuration illustrated in FIG. 3B is utilized and capacitor 504. In other words, the standby power supply 112 electrically couples to the clamp reset circuit 106 at a point between the clamp reset circuit 106 and the input return 118. The clamp reset circuit 106 further couples to the input return 118 or the negative terminal of the input ($V_{IN}$) 108. In addition, a current limiting resistor, as illustrated above with respect to FIG. 5B, may also be utilized with the clamp reset circuit 106 of FIG. 5C when slow diodes are utilized for any of the passive switches, such as passive switch D5 310.

Figure 6:
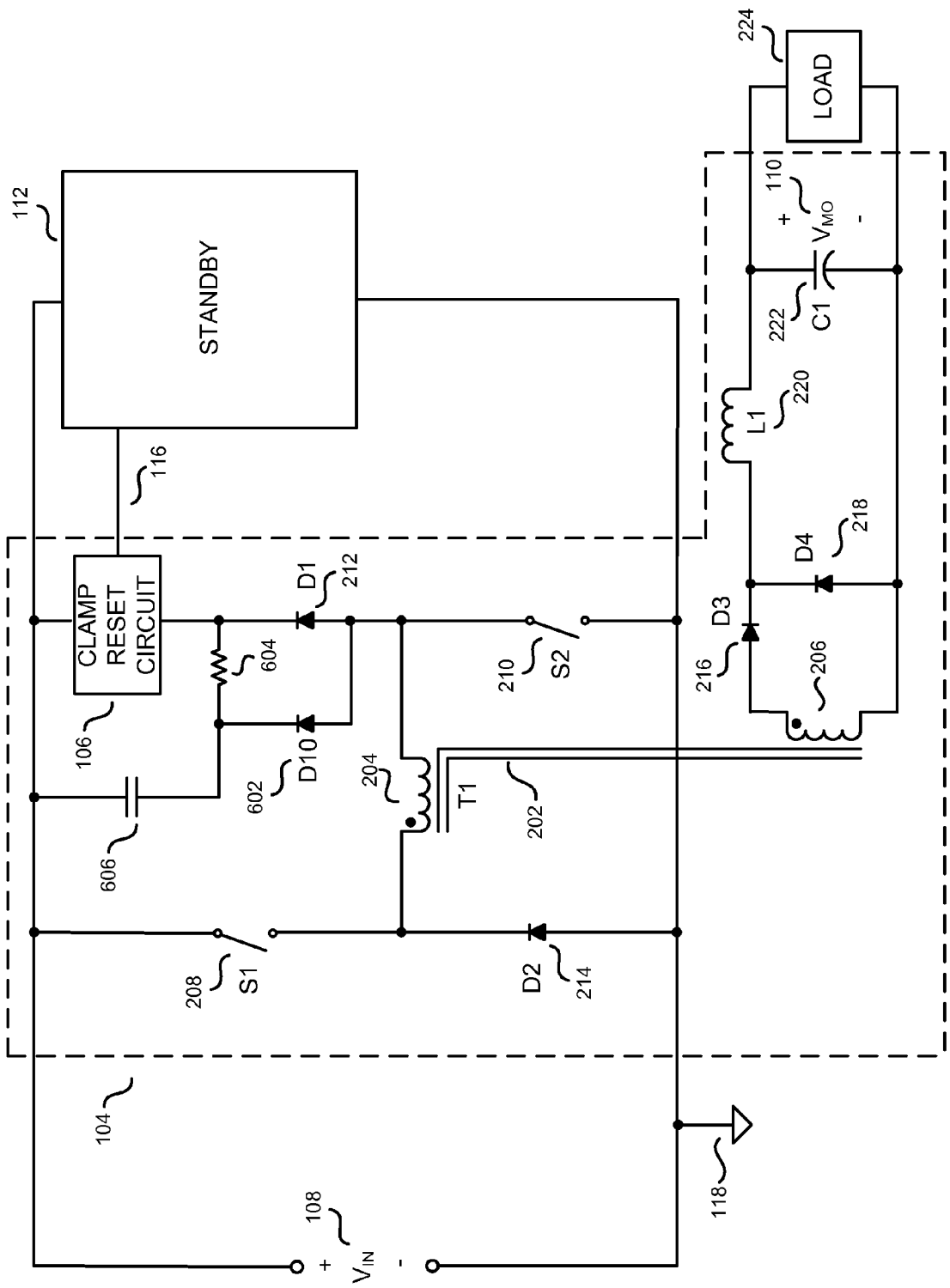
FIG. 6 illustrates another schematic diagram of a main power supply utilized with the power supply system of FIG. 1 in accordance with another embodiment of the present invention.

FIG. 6 illustrates another schematic diagram of a main power supply 104 including clamp reset circuit 106, input ($V_{IN}$) 108, main output ($V_{MO}$) 110, standby power supply 112, clamp standby connection 116, input return 118, a transformer T1 202, a primary winding 204 of transformer T1 202, a secondary winding 206 of transformer T1 202, two active switches S1 208 and S2 210, two passive switches D1 212 and D2 214, output diode D3 216, a freewheeling diode D4 218, an output inductor L1 220, output capacitor C1 222, load 224, diode D10 602, resistance 604, and capacitor 606.

The main power supply 104, clamp reset circuit 106, input ($V_{IN}$) 108, main output ($V_{MO}$) 110, standby power supply 112, clamp standby connection 116, and input return 118 couple and function as discussed above with respect to FIG. 1. In addition, the transformer T1 202, primary winding 204 of transformer T1 202, secondary winding 206 of transformer T1 202, two active switches S1 208 and S2 210, two passive switches D1 212 and D2 214, output diode D3 216, freewheeling diode D4 218, output inductor L1 220, output capacitor C1 222, and the load 224 couple and function as discussed with respect to FIG. 2. As illustrated in FIG. 6, the main power supply 104 is designed with the two-switch forward converter topology (as illustrated in FIG. 2) with the added components of diode D10 602, resistance 604, and capacitance 606.

The diode D10 602 is coupled to the primary winding 204 of transformer T1 202 and passive switch D1 212. The resistance 604 is coupled between diode D10 602 and passive switch D1 212. When a diode is utilized for passive switch D1 212, resistance 604 is coupled the cathode end of both diode D10 602 and passive switch D1 212. One end of capacitance 606 is coupled to the diode D10 602 and resistance 604 while the other end of capacitance 606 is coupled to input ($V_{IN}$) 108. In other words, the clamp reset circuit 106 is coupled across capacitance 606 and resistance 604.

In some embodiments of the present invention, diode D10 602, resistance 604, and capacitance 606 may be added to the main power supply to limit voltage spikes due to leakage inductance energy and magnetizing energy of the transformer T1 202. FIG. 6 illustrates the main power supply 104 illustrated in the two-switch forward converter topology. However, it should be appreciated that the added diode D10 602, resistance 604, and capacitance 606 may be utilized with various other topologies of the main power supply 104. As mentioned above, a diode may be used for passive switch D1 212. Depending on the length of the reverse recovery time of the diode, the diode may be considered a slow diode or a fast diode. In some embodiments, passive switch D1 212 is a slow diode as discussed with respect to FIG. 5B. Further, in some embodiments passive switch D2 214 is also a slow diode. It should be appreciated that a current limiting resistor (not shown) is coupled to passive switch D1 212 and passive switch D2 214 when either passive switch D1 212 or passive switch D2 214 are slow diodes as discussed with FIG. 5B. In the two-switch forward converter topology (without added diode D10 602, resistance 604, and capacitance 606) a voltage spike occurs from the leakage inductance energy and the magnetizing energy of transformer T1 202 due to the length of the forward recovery time of passive switch D1 212. In some embodiments, the voltage spike is within the acceptable limits of operation. However, when the voltage spike is not within the acceptable limits of operation, the diode D10 602, resistance 604, and capacitance 606 may be included to limit the voltage spike.

When the passive switch D1 212 is a diode, in operation it takes a certain amount of time for the passive switch D1 212 to switch from a reverse biased diode to a forward biased diode. This amount of time is typically referred to as the forward recovery time of the diode. During the forward recovery time of passive switch D1 212, the clamp reset circuit 106 is not electrically connected to the passive switch D1 212 and a voltage spike occurs from the leakage inductance energy of transformer T1 202. Once the forward recovery time of passive switch D1 212 has passed and passive switch D1 212 is forward biased, the clamp reset circuit 106 is electrically connected to the passive switch D1 212 and may manage the magnetizing energy and the leakage inductance energy of the transformer T1 202. By adding the diode D10 602, resistance 604 and capacitance 606, the voltage spike may be limited during the forward recovery time of diode D1 212.

In operation, when diode D10 602 is forward biased, the leakage inductance energy and the magnetizing energy of transformer T1 202 may be stored within capacitance 606. In one embodiment, diode D10 602 is a fast diode which switches from reverse bias to forward bias significantly quicker than passive switch D1 212. In some embodiments, diode D10 602 is an ultra fast diode. Since diode D10 602 has a significantly shorter forward recovery time than passive switch D1 212, the leakage inductance energy and magnetizing energy of transformer T1 202 may be stored by capacitance 606 to limit the voltage spike. Once passive switch D1 212 is forward biased, the clamp reset circuit 106 may manage the magnetizing energy and the leakage inductance energy of transformer T1 202.

Resistance 604 allows the main power supply 104 to recover the energy stored by capacitance 606. When passive switches D1 212 and D2 214 along with diode D10 602 switch from forward bias to reverse bias, resistance 604 provides a path for current from capacitance 606 through passive switch D1 212, transformer T1 202 and passive switch D2 214. In one embodiment, diode D10 602 is an ultra fast diode with a reverse recovery time significantly shorter than the reverse recovery time of passive switch D1 212. As such, diode D10 602 is reverse biased quicker than passive switch D1 212 allowing current from capacitance 606 to flow through resistance 604 and passive switch D1 212. As current from capacitance 606 flows through transformer T1 202, energy stored by the capacitance 606 is recovered by the main power supply 104. In addition, energy stored by the clamp reset circuit 106 may also be recovered by the main power supply 104 as current from the clamp reset circuit 106 flows through passive switch D1 212. By adding the diode D10 602, resistance 604 and capacitance 606, voltage spikes due to leakage inductance energy and magnetizing energy may be reduced.

While the invention herein disclosed has been described by means of specific embodiments, examples and applications thereof, numerous modifications and variations could be made thereto by those skilled in the art without departing from the scope of the invention set forth in the claims.

What is claimed is:

1. A power supply, comprising:
   a first power converter adapted to convert an input to a first voltage output, the first power converter including:
      a first transformer having a first primary winding;
      a first diode having an anode coupled to the first primary winding; and
      a first output capacitor to be coupled to a first load, wherein the first voltage output is a voltage across the first output capacitor;
   a second power converter adapted to convert the input to a second voltage output, the second power converter including:
      a second transformer having a second primary winding;
      a second diode having an anode coupled to the second primary winding; and
      a second output capacitor to be coupled to a second load, wherein the second voltage output is a voltage across the second output capacitor; and
   a shared clamp reset circuit included in the first power converter and coupled to a cathode of the first diode, wherein the shared clamp reset circuit includes a clamp connection coupled to a cathode of the second diode, and wherein the shared clamp reset circuit is adapted to manage leakage inductance energy within the first transformer and within the second transformer; and wherein the shared clamp reset circuit further comprises:
   a third capacitor coupled to store energy received from the first power converter and the second power converter; and
   a voltage limiting element coupled to the third capacitor to prevent the energy received from both the first power converter and the second power converter from exceeding a threshold, wherein the voltage limiting element limits a voltage on the third capacitor.

2. The power supply of claim 1, wherein the second power converter is adapted to remain powered up while the first power converter is powered down.

3. The power supply of claim 1, wherein the first power converter further comprises circuitry arranged in a forward converter topology.

4. The power supply of claim 3, wherein the forward converter topology is a two-switch forward converter topology.

5. The power supply of claim 1, wherein the second power converter further comprises circuitry arranged in a forward converter topology.

6. The power supply of claim 5, wherein the forward converter topology is a two-switch forward converter topology.

7. The power supply of claim 1, wherein the second power converter further comprises circuitry arranged in a flyback converter topology.

8. The power supply of claim 7, wherein the flyback converter topology is a two-switch flyback converter topology.

9. The power supply of claim 1, wherein a first end of the third capacitor is coupled to the input and a second end of the third capacitor is coupled to the clamp connection.

10. The power supply of claim 9, wherein the voltage limiting element comprises a Zener diode.

11. The power supply of claim 10, wherein an anode of the Zener diode is coupled to the input, wherein the shared clamp reset circuit further comprises a resistor having a first terminal coupled to a cathode of the Zener diode and a second terminal coupled to the second end of the third capacitor.

12. The power supply of claim 10, wherein an anode of the Zener diode is coupled to an input return, wherein the shared clamp reset circuit further comprises a resistor having a first terminal coupled to a cathode of the Zener diode and a second terminal coupled to the second end of the third capacitor.

13. The power supply of claim 10, further comprising a current limiting resistor coupled between the cathode of the second diode and the clamp connection.

* * * * *